July 19, 1960 E. V. SCHNEIDER 2,945,388
PLURAL SPEED PHONOGRAPH MECHANISM
Filed March 18, 1959 2 Sheets-Sheet 1

INVENTOR.
EMMOR V. SCHNEIDER
BY Woodling and Krost
attys.

July 19, 1960 E. V. SCHNEIDER 2,945,388
PLURAL SPEED PHONOGRAPH MECHANISM
Filed March 18, 1959 2 Sheets-Sheet 2
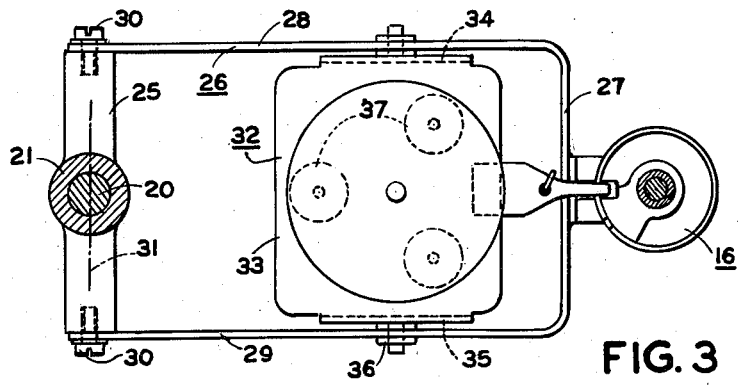
FIG. 3
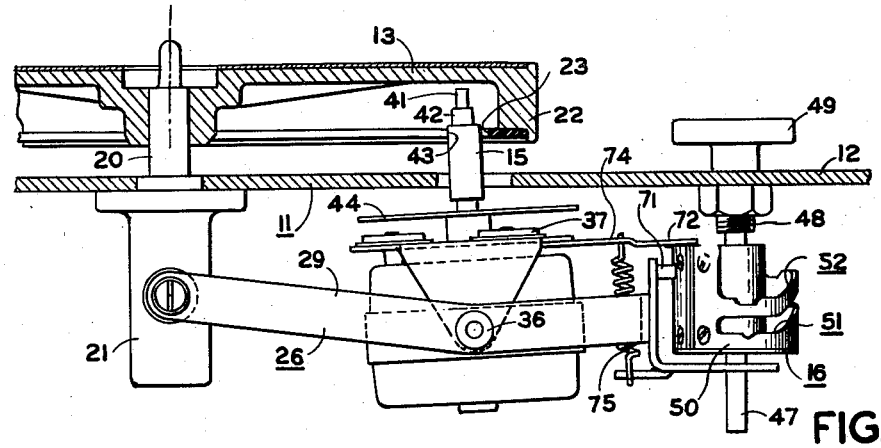
FIG. 4
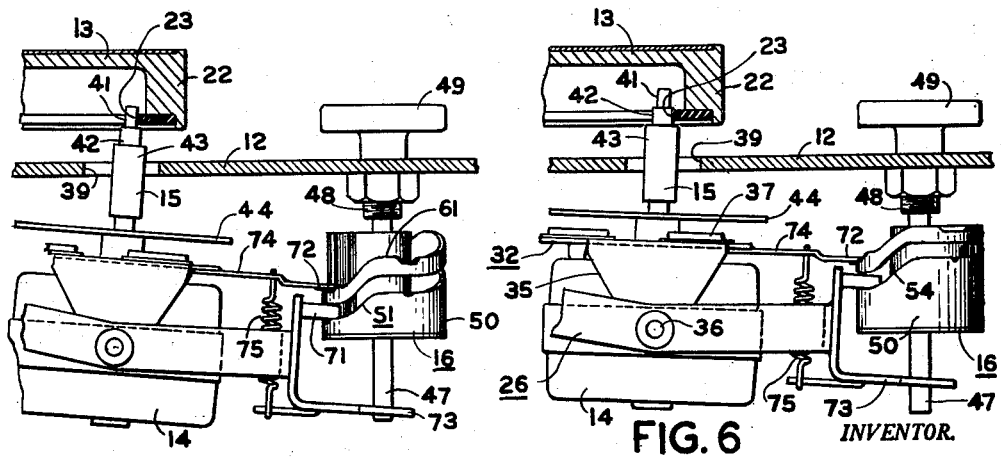
FIG. 5
FIG. 6
INVENTOR.
EMMOR V. SCHNEIDER
BY Woodling and Krost,
attys.

United States Patent Office 2,945,388
Patented July 19, 1960

2,945,388

PLURAL SPEED PHONOGRAPH MECHANISM

Emmor V. Schneider, Alliance, Ohio, assignor to Consolidated Electronics Industries Corp., a corporation of Delaware Filed Mar. 18, 1959, Ser. No. 800,294

14 Claims. (Cl. 74—199)

The invention relates in general to plural speed phonograph mechanisms and more particularly to phonograph mechanisms having a drive shaft which moves generally axially as well as laterally and which has a plurality of drive shaft steps of different diameters for cooperation with a friction drive surface on a turntable.

An object of the invention is to provide a plural speed phonograph drive mechanism wherein no idler wheel is needed.

Another object of the invention is to provide a plural speed phonograph mechanism wherein a motor is moved both axially and laterally tiltingly to change the drive train from engagement at any one of the drive shaft steps on the motor shaft to another shaft step.

Still another object of the invention is to provide a plural speed phonograph mechanism wherein the turntable has a friction drive surface on a depending annular rim thereof.

Another object of the invention is to provide a cam mechanism for both raising and lowering a motor and tilting the motor so that the motor may be tilted to disengage one of a plurality of steps on the motor shaft and then the motor moved generally vertically and then retilted to provide engagement of another selected shaft step with a rim of the turntable.

Another object of the invention is to provide first and second cams, each with sloping surfaces generally parallel and with one cam effecting generally vertical movements of the motor and the other cam providing tilting movements of the motor.

Another object of the invention is to provide a plural speed phonograph drive mechanism with first and second cams so that the motor first laterally tilts to disengage the drive train at one of the shaft steps and then generally axially moves with the shaft maintained out of contact with a rim of the turntable and then the motor retilts to effect drive engagement at the turntable rim with another drive shaft step and then the motor is positioned in elevation by a notch on the first cam.

Other objects and a fuller understanding of this invention may be had by referring to the following description and claims, taken in conjunction with the accompanying drawings, in which:

Figure 3 is a sectional view on the line 3—3 of Figure 2.

Figures 4, 5 and 6 are partial sectional views similar to Figure 2 with the speed selecting mechanism in different positions and;

Figure 1:
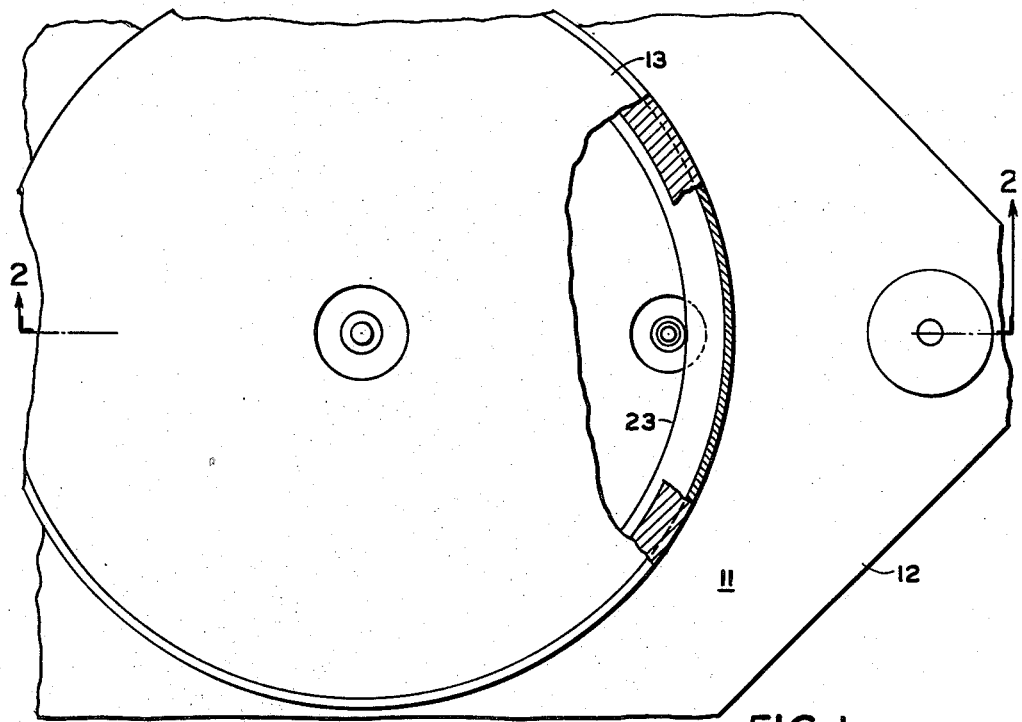
Figure 1 is a plan view partially in section of a phonograph mechanism embodying the invention.

The figures of the drawing show a plural speed phonograph mechanism 11 which includes generally a support plate 12, a turntable 13, a motor 14, a drive shaft 15, and a shifter cam mechanism 16.

As usually employed, the support plate 12 is horizontal and may be mounted in any complete phonograph mechanism. The turntable 13 has a generally vertical axis 19 of an axle 20 journalled in a bearing 21 carried on the support plate 12. The turntable 13 has a depending annular rim 22 carrying a friction drive surface 23 of any suitable friction substance such as rubber. The friction drive surface 23 faces inwardly and has a generally cylindrical inner surface.

The bearing 21 has a cross arm 25 which journals a first yoke or bracket 26. This first yoke 26 is generally U-shaped with a closed end 27 and arms 28 and 29. First ends of the arms 28 and 29 are journalled on the cross arm 25 at the bearings 30 and the axis 31 of the bearings 30 intersects the axis 19.

The first yoke 26 extends generally horizontally beneath the support plate 12 and near the closed end 27 pivotally carries a second yoke or bracket 32. This second yoke 32 is generally U-shaped with a closed end 33 and arms 34 and 35. The lower end of the arms 34 and 35 are journalled in resilient bearings 36 in the first yoke 26 with these resilient bearings aiding in noise isolation. The second yoke 32 extends generally upwardly and the motor 14 depends resiliently therefrom by the resilient supports 37. The bearings 36 are at approximately the center of gravity of the motor 14; hence, the motor mounted on the second yoke 32 may be considered to be trunnioned at these bearings 36.

The support plate 12 has an aperture 39 and the closed end 33 has an aperture 40 through which the drive shaft 15 of the motor extends. This drive shaft has first, second and third drive shaft portions 41, 42 and 43 for selected engagement with the friction drive surface 23. A slinger disk 44 is mounted on the drive shaft 15 to keep dirt and oil from the motor 14 and from the friction drive surface 23.

Figure 7:
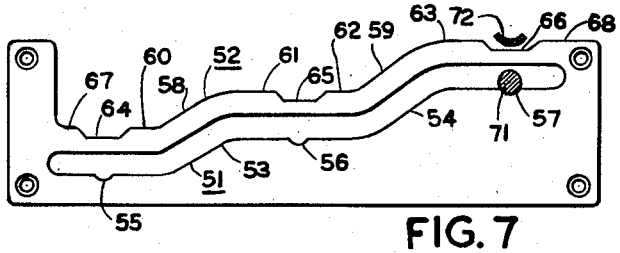
Figure 7 is a developed view of the cams.

The shifter cam mechanism 16 is mounted on a vertical axle 47 journalled at 48 in the support plate 12. A manual knob 49 is fastened to the upper end of the axle 47 to rotate this axle through approximately 270 degrees. The shifter cam mechanism 16 includes a cam drum 50 attached to the axle 47 and includes first and second cams 51 and 52. Figure 7 shows a developed view of the first and second cams 51 and 52 and shows that the first cam has sloping surfaces 53 and 54 between detent notches 55, 56 and 57.

The second cam 52 has sloping surfaces 58 and 59 generally corresponding to and parallel with the sloping surfaces 53 and 54. These sloping surfaces 58 and 59 join plateaus 60, 61, 62 and 63 on each side of relief notches 64, 65 and 66. Additional plateaus 67 and 68 are at the extremities of the second cam 52. A first cam follower 71 engages the first cam 51 and a second cam follower 72 engages the second cam 52. The first cam follower 71 is fixedly attached to the closed end 27 of the first yoke 26 and also a fork 73 is fixedly attached relative to the first cam 71 and straddles the axle 47 to maintain correct alignment of the first cam follower 71 relative to the first cam 51. An extension arm 74 on the closed end 33 of the second yoke 32 carries the second cam follower 72 and a spring 75 urges the second cam follower 72 toward the first cam follower 71, and hence urges the second cam follower 72 into engagement with the second cam 52. The first cam follower 71, as best seen in Figure 7, may be a cylindrical bar or at least has a rounded lower surface and the second cam follower 72 also has a rounded lower surface. The relief notches 64, 65 and 66 have a wider effective width than the detent notches 55, 56 and 57, e.g., the width of the relief notch 66 relative to the second cam follower 72 is greater than the width of the detent notch 57 relative to the first cam follower 71,

Operation

Figure 2:
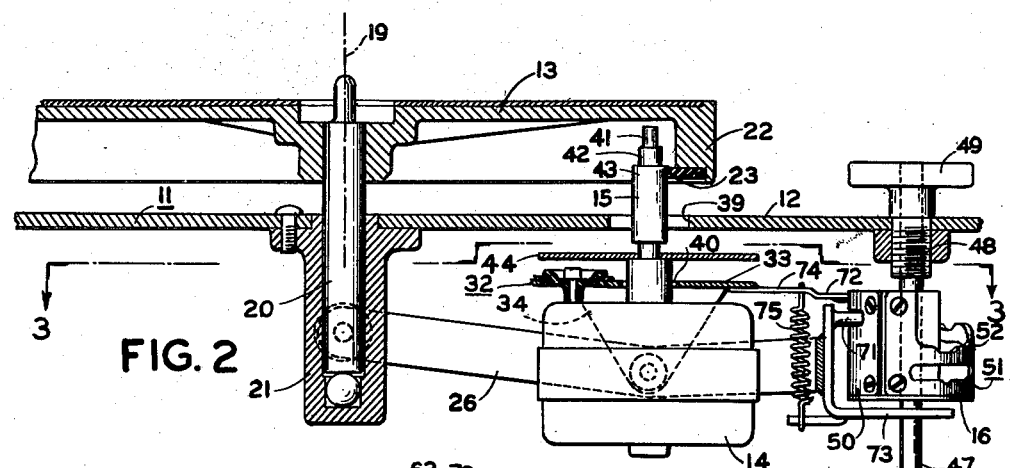
Figure 2 is a sectional view on the line 2—2 of Figure 1.

The phonograph mechanism 11 is adapted to provide three different speeds to the turntable 13 and obviously any plural number of speeds may be used upon appropriate change of the cams 51 and 52. Figure 2 shows the motor 14 having the drive shaft step 43 in engagement with the friction drive surface 23 for the engagement of a drive train. Since the drive shaft step 43 has the largest diameter of the three this will be the highest speed of the turntable 13 and the drive shaft steps 41, 42 and 43 may be selected to provide turntable speeds such as 33⅓ r.p.m., 45 r.p.m. and 78 r.p.m.

The manual knob 49 is adapted to be rotated approximately 120 degrees between each speed setting; hence, a total of three different speeds is available by rotating the knob 240 degrees. With the shifter mechanism 16 in the position shown in Figure 2, the cams and cam followers will be in the positions as shown in Figure 7. If the handle 49 is now rotated counterclockwise as viewed from above the cams 51 and 52 will move to the right as viewed in Figure 7. There will be five things which occur in shifting from one speed to another. The first thing that occurs is that the first cam follower 71 rotates out of the detent notch 57. This gives a very slight vertical movement to the first yoke 26 and to the drive shaft 15. Second, the second cam follower 72 engages the plateau 63 on one side of the relief notch 66 and this tilts the motor 14 on its trunnion 36 against the urging of the spring 75. This tilting movement disengages the drive train at the drive surface 23 because the drive shaft 15 is laterally tilted away from its friction drive surface 23. Third, the first cam follower slides down the sloping surface 54 to change the elevation of the motor 14 so that the shaft step 42 will be at the level of the drive surface 23. During this change in elevation of the motor, the sloping surface 59, because of its general parallelism with the sloping surface 54, acts on the second cam follower 72 to maintain the drive shaft 15 laterally away from the friction drive surface 23. Fourth, the second cam follower 72 slides off the plateau 62 into the area of the relief notch 65 and this causes a re-tilting movement of the motor and second yoke 32 so that the drive shaft 15 laterally moves toward the friction drive surface 23. This permits a reengagement of the drive train at the shaft step 42 as shown in Figure 6. Fifth, the first cam follower 71 engages the detent notch 56 which effects a very slight lowering of the motor 14 to properly establish the elevation of the motor shaft step 42 relative to the drive surface 23. It also properly centers the second cam follower 72 in the relief notch 65 so that this second cam follower 72 is out of engagement with the relief notch 65. This permits free floating limited lateral movements of the drive shaft 15 as may be caused by any eccentricities in the drive train. These five aforementioned functions are caused by an approximately 120 degree arcuate movement of the manual knob 49, and with another approximately 120 degree movement of the knob 49 in the same direction the same five functions would occur in the same order so that the drive shaft step 41 would be in engagement with the friction drive surface 23, as shown in Figure 5.

If now the manual knob 49 is rotated in clockwise direction from that position shown in Figure 2, this will be a movement of the cams 51 and 52 to the left as viewed in Figure 7. This movement causes the second cam follower 72 to engage the plateau 68 which tilts the drive shaft 15 away from the friction drive surface 23. This may be about a 30 degree movement and may be an off position for the drive train and entire phonograph mechanism 11. This off position disengages the drive shaft 15 from the friction drive surface to prevent establishment of any depressions in the friction drive surface 23.

Because the friction drive surface 23 has a very large diameter and also because the drive shaft 15 has a relatively large diameter there is no engagement of any small diameter drive shaft with a relatively small diameter friction drive surface which could cause depressions in such a friction drive surface, such as may occur in the prior art form of phonograph drive mechanism utilizing the small friction-tired idler wheel in the order of 1½ or 2 inches in diameter. Also, the present phonograph drive mechanism completely eliminates the need for such an idler wheel.

Although this invention has seen described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A plural speed phonograph mechanism, comprising, in combination, a frame, a turntable journalled on said frame, a drive motor carried on said frame, a drive shaft driven from said motor, a plurality of coaxial steps of different diameters on said drive shaft, a drive train selectably engageable with any one of said drive shaft steps and connecting with said turntable, first and second cams movably carried on said frame, at least one sloping surface and two plateaus on each of said first and second cams and extending substantially parallel to each other, first and second cam followers cooperating with said first and second cams, respectively, first motion transmitting means connected to said first cam follower to impart generally axial movements to said drive shaft as said first cam is moved from one plateau to another in cooperation with said first cam follower, second motion transmitting means cooperating with said second cam follower to impart a lateral movement to said drive shaft as said second cam is moved from one plateau to another in cooperation with said second cam follower, whereby as said first and second cams are moved, the second cam follower first laterally moves the drive shaft to disengage said drive train at one of said shaft steps and second the cooperation of the first cam follower on the sloping surface of the first cam effects generally axial movement of said drive shaft from one plateau to another and third the second cam follower in cooperation with another plateau permits lateral movement of the drive shaft to engage said drive train at another shaft step.

2. A plural speed phonograph mechanism, comprising, in combination, a frame, a turntable journalled on said frame, a drive motor carried on said frame, a drive shaft driven from said motor, a plurality of coaxial steps of different diameters on said drive shaft, a drive train selectably engageable with any one of said drive shaft steps and connecting with said turntable, first and second cams journalled for at least limited arcuate movement on said frame, at least one sloping surface and two plateaus on each of said first and second cams and extending substantially parallel to each other, first and second cam followers cooperating with said first and second cams, respectively, first motion transmitting means connected to said first cam follower to impart generally axial movements to said drive shaft as said first cam is moved from one plateau to another in cooperation with said first cam follower, second motion transmitting means cooperating with said second cam follower to impart a laterally tilting movement to said drive shaft as said second cam is moved from one plateau to another in cooperation with said second cam follower, whereby as said first and second cams are arcuately moved, the second cam follower first laterally tilts the drive shaft to disengage said drive train at one of said shaft steps and second the cooperation of the first cam follower on the sloping surface of the first cam effects generally axial movement of said drive shaft from one plateau to another and third the second cam follower in cooperation with another plateau permits lateral tilting movement of the drive shaft to re-engage said drive train at another shaft step.

3. A plural speed phonograph mechanism, comprising, in combination, a frame, a turntable journalled on said frame, a drive motor having a shaft and carried on said frame, a plurality of coaxial steps of different diameters on said motor shaft, a drive train selectably engageable with any one of said motor shaft steps and connecting with said turntable, first and second cams journalled for at least limited arcuate movement on said frame, at least one sloping surface and two plateaus on each of said first and second cams and extending substantially parallel to each other, first and second cam followers cooperating with said first and second cams, respectively, first motion transmitting means connected to said first cam follower to impart a generally axial movement bodily to said motor as said first cam is moved from one plateau to another in cooperation with said first cam follower, second motion transmitting means cooperating with said second cam follower to impart a laterally tilting movement bodily to said motor as said second cam is moved from one plateau to another in cooperation with said second cam follower, whereby as said first and second cams are arcuately moved, the second cam follower first laterally tilts the motor to disengage said drive train at one of the motor shaft steps and second the cooperation of the first cam follower on the sloping surface of the first cam effects generally axial movement bodily of said motor from one plateau to another and third the second cam follower in cooperation with another plateau permits lateral tilting movement of the motor to re-engage said drive train at another shaft step.

4. A plural speed phonograph mechanism, comprising, a mounting plate, a turntable journalled on said plate, a bracket, means mounting said bracket on said plate for generally vertical movements, a motor, a drive shaft driven from said motor and substantially horizontally trunnioned in said bracket near said second end thereof, a plurality of steps on said shaft, an annular friction drive surface on said turntable positioned for engagement by any of said plurality of steps, first and second cams on said mounting plate and movable together, a first cam follower cooperating with said first cam and connected to move said bracket to move said drive shaft to position each of said steps selectively at the level of said friction drive surface, a second cam follower cooperating with said second cam and connected to tilt said drive shaft on said trunnion, a spring connected to urge said drive shaft into engagement with said friction drive surface, whereby as said cams are moved the second cam and follower first tilt the drive away from the friction drive surface and secondly said first cam and follower move said drive shaft generally vertically and then the second cam and follower permit a retilting movement of said drive shaft for engagement of another selected drive shaft step with said friction drive surface.

5. A plural speed phonograph mechanism, comprising, a mounting plate, a turntable journalled on said plate, a bracket having first and second ends, means mounting said bracket on said plate for generally vertical movements, a motor carried in said bracket near said second end thereof, a drive shaft driven from said motor and extending generally vertically upwardly and substantially horizontally trunnioned in said bracket, a plurality of steps on said shaft, an annular friction drive surface on said turntable positioned for engagement by any of said plurality of steps on said drive shaft, first and second cams on said mounting plate and movable together, a first cam follower connected to cooperate with said first cam to move said bracket to move said drive shaft to position each of said steps selectively at the level of said friction drive surface, a second cam follower connected to cooperate with said second cam to tilt said drive shaft on said trunnion, a spring connected to said second cam follower and urging said drive shaft into engagement with said friction drive surface, whereby as said cams are moved the second cam and follower first tilt the drive shaft away from the friction drive surface and secondly said first cam and follower move said drive shaft generally vertically and then the second cam and follower permit a retilting movement of said drive shaft for engagement of another selected drive shaft step with said friction drive surface.

6. A plural speed phonograph mechanism, comprising, a mounting plate, a turntable journalled on said plate, a bracket having first and second ends, means journalling said bracket first end on a substantially horizontal axis on said plate, a motor substantially horizontally trunnioned in said bracket near said second end thereof, a drive shaft in said motor extending generally vertically upwardly, a plurality of steps on said shaft, an annular friction drive surface on said turntable positioned for engagement by any of said plurality of steps on said drive shaft, a first movable cam on said mounting plate, a first cam follower connected to cooperate with said first cam to move said bracket to move said motor to position each of said steps selectively at the level of said friction drive surface, a second movable cam fixed relative to said first cam, a second cam follower connected to cooperate with said second cam to tilt said motor on said trunnion, a spring connected to said second cam follower and urging said drive shaft into engagement with said friction drive surface, whereby as said cams are moved the second cam and follower first tilt the drive shaft away from the friction drive surface and secondly said first cam and follower move said bracket and motor generally vertically.

7. A plural speed phonograph mechanism, comprising, a mounting plate, a turntable journalled on said plate, a bracket having first and second ends, means journalling said bracket first end on a substantially horizontal axis near the axis of said turntable, said bracket extending generally horizontally beneath said mounting plate, a motor substantially horizontally trunnioned in said bracket near said second end thereof, a rotatable shaft in said motor extending generally vertically upwardly, a plurality of steps on said shaft, an annular friction drive surface on said turntable positioned for engagement by any of said plurality of steps on said motor shaft, a first rotatable cam on said mounting plate, a first cam follower on said bracket adapted to move said bracket and, hence, to move said motor to position each of said steps selectively at the level of said friction drive surface, a second rotatable cam fixed relative to said first cam, a second cam follower carried on said motor trunnion, the cooperation of said second cam and cam follower effecting a tilting of said motor relative to said bracket, a spring connected to said second cam follower and urging said motor shaft into engagement with said friction drive surface, whereby as said cams are rotated the second cam and follower first tilt the motor shaft away from the friction drive surface and secondly said first cam and follower move said bracket and motor generally vertically and then the second cam and follower permit a retilting movement of said motor for engagement of another selected motor shaft step with said friction drive surface.

8. A plural speed phonograph mechanism, comprising, a mounting plate, a turntable journalled on said plate, a U-shaped bracket means journalling the ends of the bracket on a substantially horizontal axis near the axis of said turntable, said U-shaped bracket extending generally horizontally beneath said mounting plate, a motor substantially horizontally trunnioned in said bracket near the outboard end thereof, a rotatable shaft in said motor extending generally vertically upwardly, a plurality of steps on said shaft, an annular friction drive surface on said turntable positioned for engagement by any of said plurality of steps on said motor shaft, a shift control shaft journalled in said mounting plate outboard of said turntable and outboard of said bracket, a first rotatable cam on said shaft, a first cam follower on said bracket cooperable with said first cam and adapted to move said bracket and, hence, to move said motor to position each of said steps selectively at the level of said friction drive surface, a second rotatable cam on said shaft fixed relative to said first cam, a second cam follower carried on said motor trunnion, the cooperation of said second cam and cam follower effecting a tilting of said motor relative to said bracket, a spring connected to said second cam follower and urging said motor shaft into engagement with said friction drive surface, whereby as said cam shaft is rotated the second cam and follower first tilt the motor shaft away from the friction drive surface and secondly said first cam and follower move said bracket and motor generally vertically and then the second cam and follower permit a retilting movement of said motor for engagement of another selected motor shaft step with said friction drive surface.

9. A plural speed phonograph mechanism, comprising, a mounting plate, a turntable journalled on said plate and having a depending annular rim, a U-shaped bracket with two arms, means journally the ends of the two arms on a horizontal axis passing through the axis of said turntable, said U-shaped bracket extending generally horizontally beneath said mounting plate, a motor horizontally trunnioned in the two arms of said bracket near the outboard ends thereof, a rotatable shaft in said motor extending generally vertically upwardly, a plurality of steps on said shaft, an annular friction drive surface on the inner surface of the rim of said turntable positioned for engagement by any of said plurality of steps on said motor shaft, a shift control shaft generally vertically journalled in said mounting plate outboard of said turntable and outboard of said bracket, a first rotatable cam on said shaft, a first cam follower on said bracket outboard end cooperable with said first cam and adapted to move said bracket and, hence, to move said motor to position each of said steps selectively at the level of said friction drive surface, a second rotatable cam on said shaft fixed relative to said first cam, a second cam follower carried on said motor trunnion, the cooperation of said second cam and cam follower effecting a tilting of said motor and said trunnion relative to said bracket, a spring interconnecting said second cam follower and said bracket urging said motor shaft into engagement with said friction drive surface, whereby as said cam shaft is rotated the second cam and follower first tilt the motor shaft away from the friction drive surface and secondly said first cam and follower move said bracket and motor generally vertically and then the second cam and follower permit a retilting movement of said motor for engagement of another selected motor shaft step with said friction drive surface.

10. A plural speed phonograph mechanism, comprising, in combination, a support plate, a turntable journalled on said support plate, a motor, a drive shaft driven from said motor, a plurality of coaxial steps of different diameters on said drive shaft, a drive train selectably engageable with any of said drive shaft steps and connecting with said turntable, first and second movable cams, a first cam follower cooperating with said first cam and connected to raise and lower said drive shaft, a second cam follower cooperating with said second cam and connected to laterally tilt said drive shaft, a spring connected to urge said second cam follower into cooperation with said second cam, a plurality of detent notches on said first cam establishing the proper elevation of said drive shaft for each of said coaxial drive shaft steps, a plurality of relief notches on said second cam corresponding to said detent notches on said first cam, generally parallel sloping surfaces on each said first and second cams between each said notches, said relief notches having an effective width greater than said detent notches, a plateau adjacent each of said relief notches, whereby upon movement of said cams from one detent notch position to another said first cam follower first moves out of said detent notch before said second cam follower engages the plateau adjacent the respective relief notch, secondly, the second cam follower engages one of said plateaus to tilt the drive shaft and hence disengage said drive train at the previously engaged drive shaft step, thirdly, the sloping surface of said first cam effects a change in elevation of said drive shaft to bring another shaft step to the level of said friction drive surface with the sloping surface on said second cam maintaining said shaft steps laterally disengaged from said drive train, fourthly said second cam follower rides off a plateau into said relief notch to effect engagement of said drive train at the selected shaft step, and fifthly said first cam follower engages the respective detent notch to establish the proper level of said selected shaft step with said second cam follower out of engagement with the surface of said relief notch to permit free floating limited lateral movements of said drive shaft.

11. A plural speed phonograph mechanism, comprising, in combination, a support plate, a turntable journalled on said support plate, a friction drive surface on said turntable, a first yoke mounted on said support plate for up and down movements, a second yoke mounted on said first yoke for tilting movements, a motor, a drive shaft driven from said motor and carried on said second yoke, a plurality of coaxial steps of different diameters on said drive shaft adapted for selected engagement with said friction drive surface, first and second movable cams, a first cam follower cooperating with said first cam and connected to raise and lower said first yoke, a second cam follower cooperating with said second cam and connected to tilt said second yoke, a spring connected to urge said second cam follower into cooperation with said second cam, a plurality of detent notches on said first cam establishing the proper elevation of said drive shaft for each of said coaxial drive shaft steps relative to said friction drive surface, a plurality of relief notches on said second cam corresponding to said detent notches on said first cam, generally parallel sloping surfaces on each said first and second cams between each said notches, said relief notches having an effective width greater than said detent notches, a plateau adjacent each of said relief notches, whereby upon movement of said cams from one detent notch position to another said first cam follower first moves out of said detent notch before said second cam follower engages the plateau adjacent the respective relief notch, secondly, the second cam follower engages one of said plateaus to tilt the second yoke and hence move the previously engaged drive shaft step laterally away from said friction drive surface, thirdly, the sloping surface of said first cam effects a change in elevation of said drive shaft to bring another shaft step to the level of said friction drive surface with the sloping surface on said second cam maintaining said shaft steps laterally away from said friction drive surface, fourthly said second cam follower rides off a plateau into said relief notch to effect engagement of the selected shaft step with said friction drive surface, and fifthly said first cam follower engages the respective detent notch to establish the proper level of said selected shaft step with said second cam follower out of engagement with the surface of said relief notch to permit free floating limited lateral movements of said drive shaft.

12. A plural speed phonograph mechanism, comprising, in combination, a support plate, a turntable journalled on said support plate, a friction drive surface on said turntable, a first yoke mounted on said support plate for generally vertical movements, a second yoke journalled on said first yoke, a motor carried on said second yoke, a drive shaft on said motor, a pluality of coaxial steps of different diameters on said drive shaft adapted for selected engagement with said friction drive surface, first and second rotatable cams, a first cam follower connected to raise and lower said first yoke and said motor, a second cam follower connected to tilt said second yoke and said motor, a spring connected to urge said second cam follower into cooperation with said second cam, a plurality of detent notches on said first cam establishing the proper elevation of said motor for each of said coaxial drive shaft steps relative to said friction drive surface, a plurality of relief notches on said second cam corresponding to said detent notches on said first cam, generally parallel sloping surfaces on each said first and second cams between each said notches, said relief notches having an effective width greater than said detent notches, a plateau on both sides of all said relief notches, whereby upon rotation of said cams from one detent notch position to another said first cam follower first moves out of said detent notch before said second cam follower engages the plateau adjacent the respective relief notch, secondly, the second cam follower engages one of said plateaus to tilt the second yoke and hence move the previously engaged drive shaft step laterally away from said friction drive surface, thirdly, the sloping surface of said first cam effects a change in elevation of said motor to bring another shaft step to the level of said friction drive surface with the sloping surface on said second cam maintaining said shaft steps laterally away from said friction drive surface, fourthly said second cam follower rides off a plateau into said relief notch to effect engagement of the selected shaft step with said friction drive surface, and fifthly said first cam follower engages the respective detent notch to establish the proper level of said selected shaft step with said second cam follower out of engagment with the surface of said relief notch to permit free floating limited lateral movements of said drive shaft.

13. A plural speed phonograph mechanism, comprising, in combination, a support plate, a turntable journalled on said support plate, an annular rim on said turntable, a friction drive surface on said rim, a generally horizontal first yoke having two arms with the ends of the two arms journalled on said support plate on a substantially horizontal axis, a generally vertical second yoke journalled on a horizontal axis near the outboard end of said first yoke, a motor resiliently and dependently carried from the central portion of said second yoke, a generally vertical output shaft on said motor extending upwardly through openings in said second yoke and support plate, a plurality of coaxial steps of different diameters on the upper end of said motor shaft adapted for selected engagement with said friction drive surface, a cam drum journalled on said support plate outboard of the central portion of said first yoke, first and second cams on said cam drum, a first cam follower on said first yoke and cooperating with said first cam to raise and lower said motor, a second cam follower on the central portion of said second yoke and cooperating with said second cam to tilt said second yoke and motor, a spring connected to urge said second cam follower into cooperation with said second cam, a plurality of detent notches on said first cam establishing the proper elevation of said motor for each of said coaxial motor shaft steps relative to said friction drive surface, a plurality of relief notches on said second cam corresponding to said detent notches on said first cam, generally parallel sloping surfaces on each said first and second cams between each said notches, said relief notches having an effective width greater than said detent notches, a plateau on both sides of all said relief notches, whereby upon rotation of said cam drum from one detent notch position to another said first cam follower first moves out of said detent notch before said second cam follower engages the plateau adjacent the respective relief notch, secondly, the second cam follower engages one of said plateaus to tilt the second yoke and hence move the previously engaged motor shaft step laterally away from said friction drive surface, thirdly, the sloping surface of said first cam effects a change in elevation of said motor to bring another shaft step to the level of said friction drive surface with the sloping surface on said second cam maintaining said shaft steps laterally away from said friction drive surface, fourthly said second cam follower rides off a plateau into said relief notch to effect engagement of the selected shaft step with said friction drive surface, and fifthly said first cam follower engages the respective detent notch to establish the proper level of said selected shaft step with said second cam follower out of engagement with the surface of said relief notch to permit free floating limited lateral movements of said motor shaft.

14. A plural speed phonograph mechanism, comprising, in combination, a horizontal support plate, a turntable journalled on a vertical axis on said support plate, a depending annular rim on said turntable, an inner friction drive surface on said rim, a generally horizontal first, yoke having two arms with the ends of the two arms journalled below said support plate on a horizontal axis intersecting said turntable axis, a generally vertical upwardly extending second yoke journalled on a horizontal axis near the outboard end of said first yoke, a motor resiliently and dependently carried from the central portion of said second yoke, a generally vertical output shaft on said motor extending upwardly through openings in said second yoke and support plate, three coaxial steps of different diameters on the upper end of said motor shaft adapted for selected engagement with said turntable rim friction drive surface, a vertical axis cam drum journalled below said support plate and outboard of the central portion of said first yoke, a manual knob above said support plate connected to rotate said cam drum through 270°, first and second cams fixed on said cam drum, a first cam follower on the central portion of said first yoke and cooperating with said first cam to raise and lower said motor, a second cam follower on the central portion of said second yoke and cooperating with said second cam to tilt said second yoke and motor, a spring connecting said first and second cam followers together to urge said second cam follower into cooperation with said second cam three detent notches on said first cam establishing the proper elevation of said motor for each of said three coaxial motor shaft steps relative to said friction drive surface, three relief notches on said second cam corresponding to said detent notches on said first cam, generally parallel sloping surfaces on each said first and second cams between each said notches, said relief notches being wider than said detent notches, a plateau on both sides of all said relief notches, whereby upon rotation of said cam drum from one dent notch position to another said first cam follower first moves out of said detent notch before said second cam follower engages the plateau adjacent the respective relief notch, secondly, the second cam follower engages one of said plateaus to tilt the second yoke and hence move the previously engaged motor shaft step laterally away from said friction drive surface, thirdly, the sloping surface of said first cam effects a change in elevation of said motor to bring another shaft step to the level of said friction drive surface with the sloping surface on said second cam maintaining said shaft steps laterally away from said friction drive surface, fourthly said second cam follower rides off a plateau into said relief notch to effect engagement of the selected shaft step with said friction drive surface, and fifthly said first cam follower engages the respective detent notch to establish the proper level of said selected shaft step with said second cam follower out of engagement with the surface of said relief notch to permit free floating limited lateral movements of said motor shaft.

References Cited in the file of this patent
UNITED STATES PATENTS
2,814,956  Wennerbo et al. _____ Dec. 3, 1957